United States Patent
Kuno et al.

(10) Patent No.: US 9,934,261 B2
(45) Date of Patent: Apr. 3, 2018

(54) PROGRESS ANALYZER FOR DATABASE QUERIES

(75) Inventors: Harumi Kuno, Cupertino, CA (US); Janet L. Wiener, Palo Alto, CA (US); Umeshwar Dayal, Saratoga, CA (US); Stefan Krompass, Garching (DE)

(73) Assignee: Hewlett Packard Enterprise Development LP, Houston, TX (US)

(*) Notice: Subject to any disclaimer, the term of this patent is extended or adjusted under 35 U.S.C. 154(b) by 815 days.

(21) Appl. No.: 12/401,503

(22) Filed: Mar. 10, 2009

(65) Prior Publication Data
US 2010/0235349 A1    Sep. 16, 2010

(51) Int. Cl.
G06F 7/00    (2006.01)
G06F 17/30   (2006.01)

(52) U.S. Cl.
CPC ............... *G06F 17/30306* (2013.01)

(58) Field of Classification Search
None
See application file for complete search history.

(56) References Cited

U.S. PATENT DOCUMENTS

| 6,714,938 | B1* | 3/2004 | Avadhanam et al. | |
| 2003/0177137 | A1 | 9/2003 | MacLeod et al. | |
| 2005/0222965 | A1* | 10/2005 | Chaudhuri et al. | 707/1 |
| 2006/0190310 | A1 | 8/2006 | Gudla et al. | |
| 2006/0200451 | A1 | 9/2006 | Kosuru et al. | |
| 2006/0235818 | A1* | 10/2006 | Muras | 707/1 |
| 2007/0100793 | A1* | 5/2007 | Brown et al. | 707/2 |
| 2007/0143246 | A1 | 6/2007 | Bestgen et al. | |
| 2007/0174329 | A1* | 7/2007 | Anderson et al. | 707/102 |
| 2008/0052720 | A1* | 2/2008 | Barsness et al. | 718/104 |
| 2008/0071754 | A1* | 3/2008 | Muras | 707/3 |
| 2008/0275858 | A1* | 11/2008 | Day et al. | 707/3 |

* cited by examiner

*Primary Examiner* — Thu Nga Nguyen
(74) *Attorney, Agent, or Firm* — Hanley Flight & Zimmerman, LLC (57) ABSTRACT

A data processing system includes a query progress analyzer. The database processing system comprises a receiver that receives database queries including a target query directed to a database and a query analyzer. The query analyzer is coupled to the receiver and analyzes progress status of the target query based on comparison of measured target query resource usage to resource usage predicted from a query plan of the target query and measured system resource usage.

19 Claims, 8 Drawing Sheets

PROGRESS ANALYZER FOR DATABASE QUERIES

BACKGROUND

Business Intelligence (BI) database systems are typically used to process extremely complex queries operating upon massive amounts of data. Processing of complex queries is a fundamental task of modern enterprises which rely upon the collection, integration, and analysis of an expanding sea of information.

Analysts predict that data warehouses will grow in size and complexity, and find that Business Intelligence (BI) is at a point in evolution between manual and automated techniques. Traditionally, enterprises have used BI for offline, strategic decision-making with a small number of expert users analyzing historical data and decision-making cycles last weeks or months. As enterprises become more automated, real-time, and data driven, the industry is evolving toward adaptive, operational BI systems that support online, operational decision-making at all levels in the enterprise using high quality information that is delivered in real-time to analytic applications and integrated into the enterprise's business processes.

For example, an on-line retailer may want to analyze a user's real-time click stream data and up-to-the-minute inventory to offer dynamically priced product bundles. A bank's goals generally include detection and reaction in real-time to fraudulent transactions. A logistics provider would like to dynamically reconfigure shipping routes in response to weather conditions. The worldwide business analytics market, which includes data warehouse platform software, BI tools, and analytics applications, is expected to have steady growth in the coming years.

Workload management is particularly useful to data warehouses, for the same reasons that workload management is especially challenging in the data warehouse context. BI queries exhibit a huge variance in response times. Most queries are known to execute in under a minute, but some small number of queries may require hours of execution time. According to conventional wisdom, presence of even a few poorly optimized queries can significantly impact the performance of a data warehouse system by dominating resources that could otherwise be used by properly functioning queries. Accurate estimation of the duration of a long-running query is not straightforward. Although customers may have service level agreements (SLAs) that set job deadlines and specify financial consequences for failing to meet the deadlines, some deadlines are not necessarily explicit linking of SLAs to deadlines may be difficult or impossible. Furthermore, prediction of runtime characteristics of a database query can be extremely difficult because resource contention with other queries running in the system concurrently can cause a query to spend significantly more time waiting on one or more system resources than is spent actually using the resources. Such contention is also extremely difficult to predict.

Query execution has traditionally been monitored using query progress indicators, parameters formed as part of workload execution management, and query runtime statistics. Query progress indicators are tools that attempt to quantify as a fraction the work that a running query has completed over the amount of work the query is likely to complete in total. Most commonly, progress indicators are based on usage of intermediate result size as a direct reflection of progress. For example, statistics including output cardinality (count) and average tuple size can be collected to determine progress. Some techniques distinguish between classes of physical operators based on how effective estimation methods are for different classes. Specifically, accuracy of estimation can be improved when excluding physical operators that perform nested iteration. Query progress indicators have several disadvantages. First, query progress indicators rely on accurate counts of the tuples processed by various operators and thus require developers to instrument the database core engine in order to count the tuples input and emitted from every operator. Second, different types of operators process tuples at different rates so that tuple-count based progress indicators require a model of how the time spent to process a query is divided among various types of operators. Thus, per-operator models of tuple processing rates and a model of mutual interactions among the per-operator models within processing of a single query are required for analysis. Third, query progress indicators do not reflect measures of work that are independent of tuples processed. For example, analysis of a workload management system may depend on whether a given query has already completed the disk-I/O portion of work, information that is not available through usage of a tuple-count based query progress indicator.

Workload execution management is implemented in many commercial database systems and includes various techniques and systems for dealing with problem queries. For example, HP-UX Workload Manager, IBM Query Patroller for DB2, SQLServer Query Governor, Teradata's Dynamic Workload Manager, and Oracle's Database Resource Manager all include functionality to control or address queries that exceed a limit on estimated row counts, processing time, or place a limit on the number of join operations that can appear in a plan. IBM's Query Patroller for DB2 and Oracle's Database Resource Manager enable a system administrator to define usergroups to which a static priority and a share of system resources for each group are assigned. The higher the priority of a group, the more resources are allocated. However, the static prioritization is not associated with response time requirements or service level agreement (SLA) conformance. Similarly, SQLServer Query Governor prevents queries with estimated query costs that exceed a user-set upper cost limit from starting, as opposed to stopping the queries after reaching a predefined limit. These commercial attempts at managing long-running queries have required one or more of the following: (1) absolute limits on resource usage (for example, not admitting a query or stopping a query that exceeds a limit on estimated row counts, processing time, or placing a limit on the number of join operations that can appear in a plan), and (2) capability to obtain statistics such as actual input and output cardinalities. Obtaining such statistics can be prohibitively expensive, placing a great load on a running system.

SUMMARY

Embodiments of a data processing system include a query progress analyzer. The database processing system comprises a receiver that receives database queries including a target query directed to a database and a query analyzer. The query analyzer is coupled to the receiver and analyzes progress status of the target query based on comparison of measured target query resource usage to resource usage predicted from a query plan of the target query.

BRIEF DESCRIPTION OF THE DRAWINGS

Embodiments of the invention relating to both structure and method of operation may best be understood by referring to the following description and accompanying drawings.

DETAILED DESCRIPTION

Several embodiments of systems and computer-executed methods implement a progress analyzer for long-running database queries.

Progress analysis during database query processing enables workload management, both manual (human) and automatic, to determine the remaining run-time of active requests, as well as to gauge the potential impact of specific queries upon system performance, and to modify the overall work schedule accordingly. For example, progress analysis can be exploited to decide whether or not to admit a query, abort an execution, lower or raise a query's priority, focus on an alternative activity, and the like.

Embodiments of a database system and associated method include a progress indicator that indicates the progress of a query in terms of multiple performance metrics which may include, but not limited to, elapsed time since query execution began, predicted time remaining before query completion, resource usage thus far compared to predicted total resource usage for various resources such as central processing units (CPU), memory, messages, disk I/O, and the like. Various systems and methods can also distinguish between different types of potentially long-running queries in terms of workload management concerns.

Figure 1A:
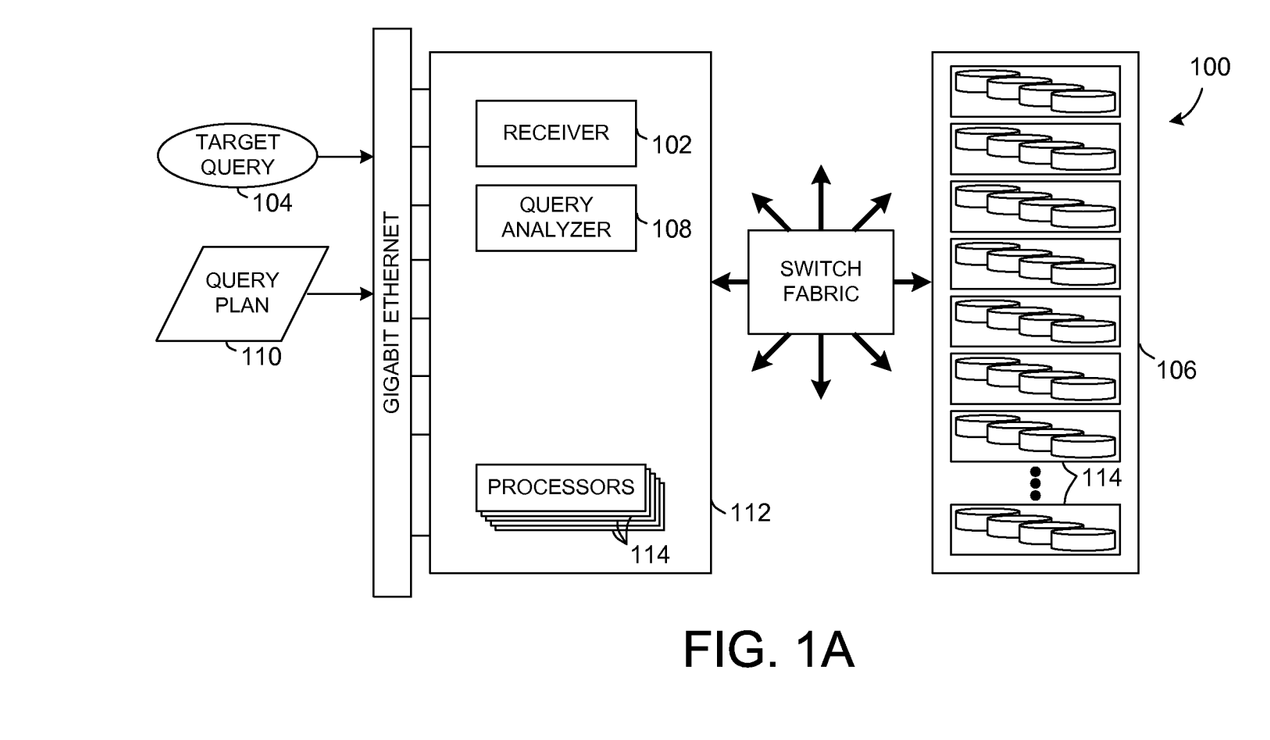
FIGS. 1A and 1B are schematic block diagrams showing embodiments of data processing systems that include a query progress analyzer.

Referring to FIG. 1A, a schematic block diagram illustrates an embodiment of a data processing system 100 including a query progress analyzer 108. The database processing system 100 comprises a receiver 102 that receives database queries including a target query 104 directed to a database 106 and a query analyzer 108. The query analyzer 108 is coupled to the receiver 102 and analyzes progress status of the target query 108 based on comparison of measured target query resource usage to resource usage predicted from a query plan 110 of the target query 104 and measured system resource usage.

The query analyzer 108 can analyze the target query progress status by predicting performance characteristics based on the query plan 110, and acquiring a snapshot of resource usage of the executing target query 104 for resources included in the prediction. The query analyzer 108 compares the snapshot of resource usage to predicted total resource usage.

In contrast to query progress indicators, which generally only monitor and predict tuple counts but can be extended to predict not only the count but also the distribution of values, the query analyzer 108 enables the predicted distribution to be compared with the actual distribution as values are produced, refining estimates based on the comparison.

In another query progress indicator implementation, a statistics collector operator can be inserted into the query execution plan that uses reservoir sampling to gather statistics about intermediate results, including information about distinct values and key value distributions. The statistics can be used as input into a query re-optimization algorithm with a goal to optimize execution of the query, either by producing a better query plan for the remainder of the query's execution or by improving resource allocation for the query. The query analyzer 108 extends functionality of a statistics collector operator by using the statistics to produce an estimate of the percentage of work done so far.

Another query progress indicator implementation uses a feedback loop to adjust estimates of table size and predicate selectivity, but collects actual statistics only after query execution. The query analyzer 108 enhances analysis by measuring system resource usage at query runtime.

The query analyzer 108 can acquire a snapshot of performance statistics for the database 106 while the database 106 is running.

The query analyzer 108 recommends an action based on the comparison of measured target query resource usage to resource usage predicted from a query plan of the target query.

An example system can manage execution of a set of queries in a database system by distinguishing between various types of long-running queries to take appropriate management actions when necessary. Different types of long-running queries can be distinguished based on performance characteristics, enabling characterization of the likely impact of each type upon the performance of the system as a whole and informed decision-making about what actions to take. In an example implementation, for each query executing in the database system one or more of various parameters can be monitored and tracked including: (1) the amount of execution time that a query optimizer estimates would be necessary to execute the query if run in isolation; (2) for a query optimizer that provides estimates in terms of cardinalities instead of execution time, an estimation of the time needed to process a given tuple which can then be used to translate from cardinality to execution time estimates; (3) elapsed time ("wall clock time") for which the query has been running; and (4) the amount of execution time consumed so far by the query.

The query analyzer 108 can extend the analysis beyond execution time alone to explicitly take into account other measures of "work" that are visible during query execution, such as disk i/o, memory usage, and the like. Analysis of the additional work measures is useful because not all operators are CPU-bound, and thus CPU-time alone is not necessarily an accurate measure of work done. The query analyzer 108 can explicitly take multiple measures into account, and furthermore also distinguish between metrics reflecting resources that can be used by multiple queries concurrently, such as network usage measured by the number of messages exchanged, and resources for which queries take turns at possession, for example CPU usage as measured by execution time. The distinction between concurrent and alternate usage enables better modeling of the nature of interactions between queries executing in the system, which in turn enables us more accurate analysis of the state of the system and the status of an individual query.

The database system 100 can further comprise a database server 112 that services the database queries. The query analyzer 108 can execute from the database server 112.

The query analyzer 108 analyzes target query 104 in terms of a plurality of resources 114.

The query analyzer 108 can predict performance characteristics of the target query 104 that is run in isolation on a selected database system 106 based on the query plan 110 of the target query 104.

The query analyzer 108 measures system resource usage statistics and overall system usage statistics at runtime of the target query 104.

The query analyzer 108 categorizes executing queries in terms of ratio of predicted to actual resource usage including consideration of elapsed time.

The query analyzer 108 distinguishes between metrics reflecting resources usable by multiple queries concurrently and resources with shared, alternate usage among multiple queries.

Various techniques can be used to estimate the remaining CPU time for a running query, given visibility into operator-level statistics including: (1) comparing the number of tuples emitted by each operator to the output cardinality estimated by the query optimizer; (2) converting the query optimizer's estimates into an estimate of CPU-time, then comparing the estimates to the actual amount of CPU-time consumed so far by each operator; (3) building a model for each operator type that relates the number of tuples processed to the CPU time used; (4) combining the estimates produced by method (3) with the operator-level statistics to produce an estimate of the total amount of CPU time remaining. In addition, a slowdown factor can be computed when the ratio of tuples processed over elapsed time is lower than expected.

The query analyzer 108 can extend the analysis of estimated remaining CPU time for the running query by predicting query performance characteristics, thereby enabling determination of the possibility of a slowdown rather than simply measuring a slowdown. The query analyzer 108 can also detect skew and correct cardinality estimates.

Many commercial database systems provide query runtime statistics tools for measuring the resource consumption of a running query. For example, the Neoview Runtime Statistics tool reports on the resource usage of a query including heap and space usage. The query analyzer 108 can extend functionality by considering predicted resource usage, and quantifying the progress made by a query and/or the work remaining to be done by that query.

For example, Neoview Workload Management Services (NWMS) forms an infrastructure to manage system and service-level resources for executing queries on the Neoview platform. NWMS manages and monitors active query resource usage on a Neoview platform, and includes management tools for configuring service levels and establishing rules defining management and control of query execution. NWMS enables monitoring of queries in service levels, identification of problematic queries, holding queries to free resources as well as maximize throughput, and canceling runaway queries to prevent monopolization of system resources. NWMS operates as query manager by obtaining information from requesting CONNECT processes and using the information to manage query workloads, managing both prepared queries and queries that are executed dynamically. Once a connection is established between the CONNECT process and NWMS, NWMS begins monitoring submitted queries to take appropriate action. Before executing a submitted query, NWMS captures information about the query, such as the query ID, CPU time, I/O time, messages time, idle time, total time, and cardinality. NWMS also obtains query runtime statistics dynamically from the Neoview database engine. At preconfigured intervals, NWMS captures system information, such as CPU usage, memory usage, query cache hits, and disk I/O, and also captures query runtime statistics. NWMS evaluates collected information against NWMS rules such as the CPU threshold limit, the minimum cost to manage a query value for a service, and the maximum cost of a query value for a service. NWMS either executes, waits to execute, or rejects the query.

Figure 1B:
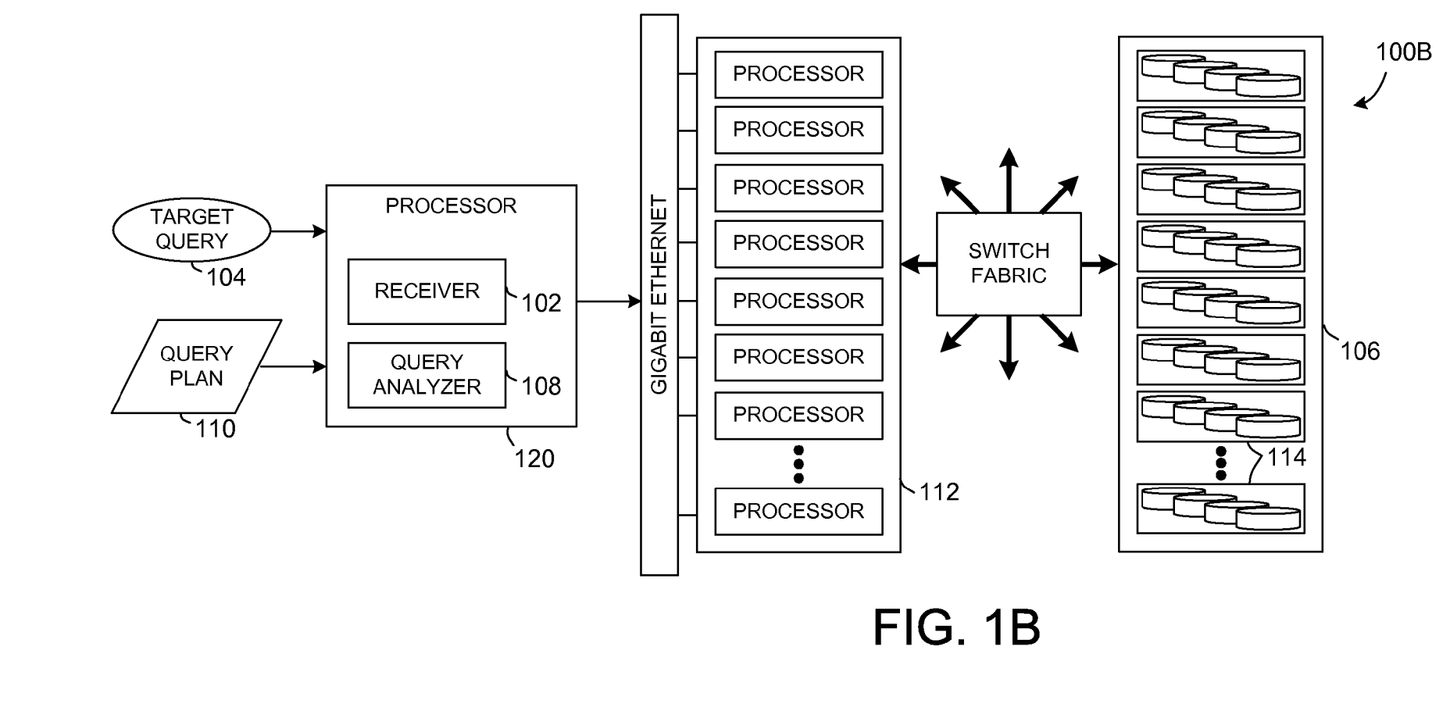

Referring to FIG. 1B, a schematic block diagram illustrates another embodiment of a data processing system 100B that includes a query progress analyzer 108. The data processing system 100B comprises a database server 112 that services the database queries, and a processor 120 communicatively coupled to the database server 112 wherein the query analyzer 108 executes from the processor 120.

The query analyzer 108 can use several techniques to acquire information for analyzing progress of long-running queries. First, a database query's plan can be used to predict the performance characteristics of the target database query when run in isolation on a specific system. Second, a query's system resource usage statistics at query runtime can be measured using a statistics tool such as Neoview Runtime Statistics tool. Third, overall system resource usage statistics at runtime can be measured using a tool such as the NeoBusy tool or the Neoview Repository. Fourth, executing queries can be categorized in terms of the ratio of predicted to actual resource usage taking into account elapsed time and also taking into account multiple resource usage measures.

Neoview Repository is a set of Neoview SQL tables and a set of programs that collect and store statistics as well as other information about queries, query sessions, tables, disks, processing nodes, and selected processes. The Repository can be accessed through any standard ODBC/JDBC SQL interface. Neoview Performance Analyzer and Reports are two tools that access the repository for presentation of the captured data.

For each query executed, log records are maintained in the Neoview Workload Repository for security and historical performance tracking, alerting, resource accounting, capacity planning, and reporting. Captured session and SQL statement metrics may include user ID, session ID, statement ID, query ID, SQL text, compile time, estimated costs, elapsed execution time, and processor utilization details. Additionally, runtime performance metrics can be maintained and captured by the Neoview Run Time Services (RTS) infrastructure during in-flight query execution so that visibility is maintained into the current state of the query environment. Captured in-flight metrics for each query can include elapsed time, processor busy time, message counts, and bytes. Repository and runtime information can be made available for viewing from the Neoview Management Dashboard or through Neoview Reports using SQL views and scripts.

Figure 2A:
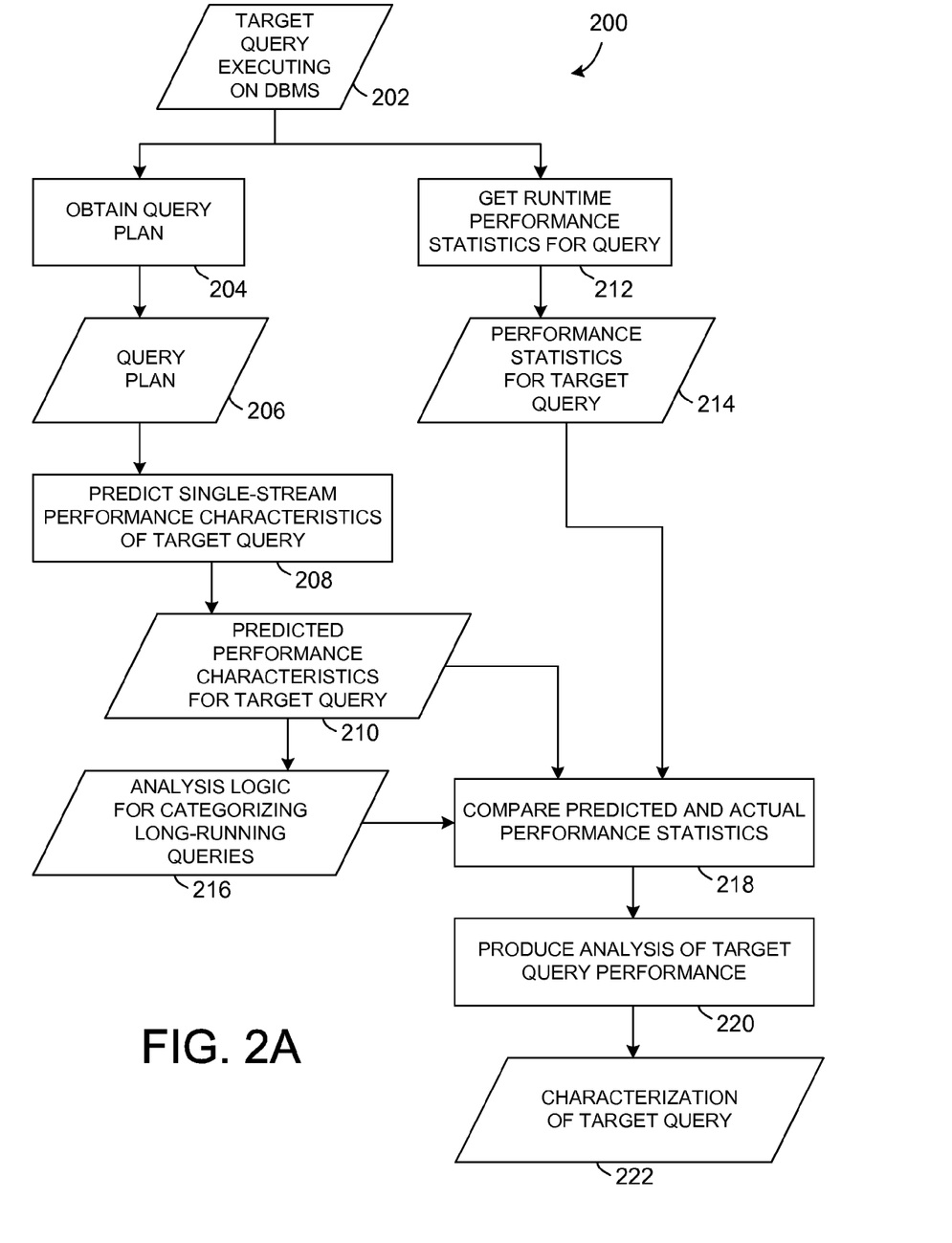
FIGS. 2A, 2B, and 2C are flow charts illustrating embodiments of methods for analyzing progress for database queries.

Referring to FIG. 2A in combination with FIGS. 1A and 1B, a flow chart illustrates an embodiment of a method 200 for analyzing progress for database queries. A target query 202, possibly long-running, has progress analyzed by the query analyzer 108. The target query 202 can execute on a database management system (DBMS). The query analyzer 108 produces an analysis of the status of the target query's progress via multiple steps. First, the target query's plan is obtained 204 and used to predict 208 the performance characteristics of the query. The query analyzer 108 can store the query plan 206. The prediction 208 applies to single-stream performance characteristics of the target query and can include a number of metrics for resources that are involved in executing the query, including for example: (1) CPU time—the amount of execution time; (2) Disk I/O—the number of disk I/Os; (3) Memory—the total amount of memory used to execute the query; (4) Messages—a count of the number of messages exchanged in course of execution of the query; and (5) Elapsed time—time used to execute the query when run in isolation. Predicted performance characteristics for the target query can be stored 210.

Second, a snapshot of the executing target query's usage of the resources for which predictions are given is acquired 212, thereby obtaining runtime performance statistics for the query. Performance statistics for the target query can also be stored 214.

Figure 2B:
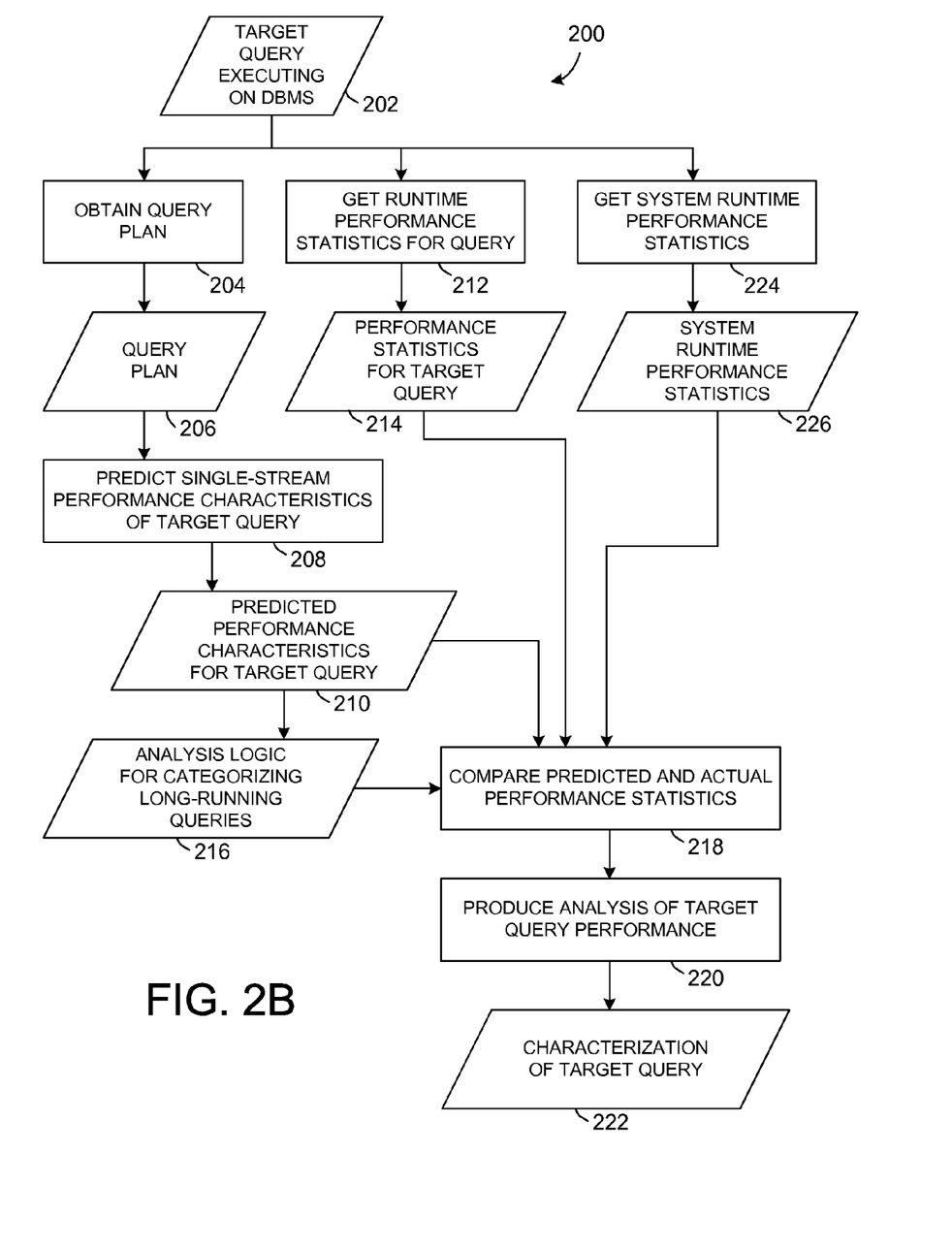

In some embodiments or applications, as shown in FIG. 2B, a snapshot of the performance statistics for the running system can optionally be acquired 224, and system runtime performance statistics can be stored 226. Examples of system performance statistics can include load average, the number of executing queries, resource usage for other executing queries, and the like.

In either embodiment of FIG. 2A or 2B, the technique can further comprise producing 218 an analysis comparing how the snapshot of resource usage so far compares to the predicted total resource usage. The comparison 218 includes analysis of predicted performance characteristics 210 and performance statistics for the target query 214, in combination with analysis logic 216 for categorizing long-running queries. In systems that optionally acquire 224 system runtime statistics, the analysis 218 comparing the snapshot of resource usage to predicted total resource usage can further include analysis of system runtime performance statistics 226. Characterization of the target query can be stored 222.

For example, the analysis may find that the query has been running ten times as long as expected, but has used only a fraction of the CPU time and Disk I/Os that were predicted, thus optionally noting that the system is heavily loaded. The analysis may advise that the query is probably being starved.

In another example, the analysis may indicate that the query has been running about twice as long than expected, but that has incurred a hundred times more Disk I/Os than expected and used more than a fair share of CPU time for the time period the query has been running, and that therefore the query may be dominating execution and resources in the system, thus slowing the system.

Figure 2C:
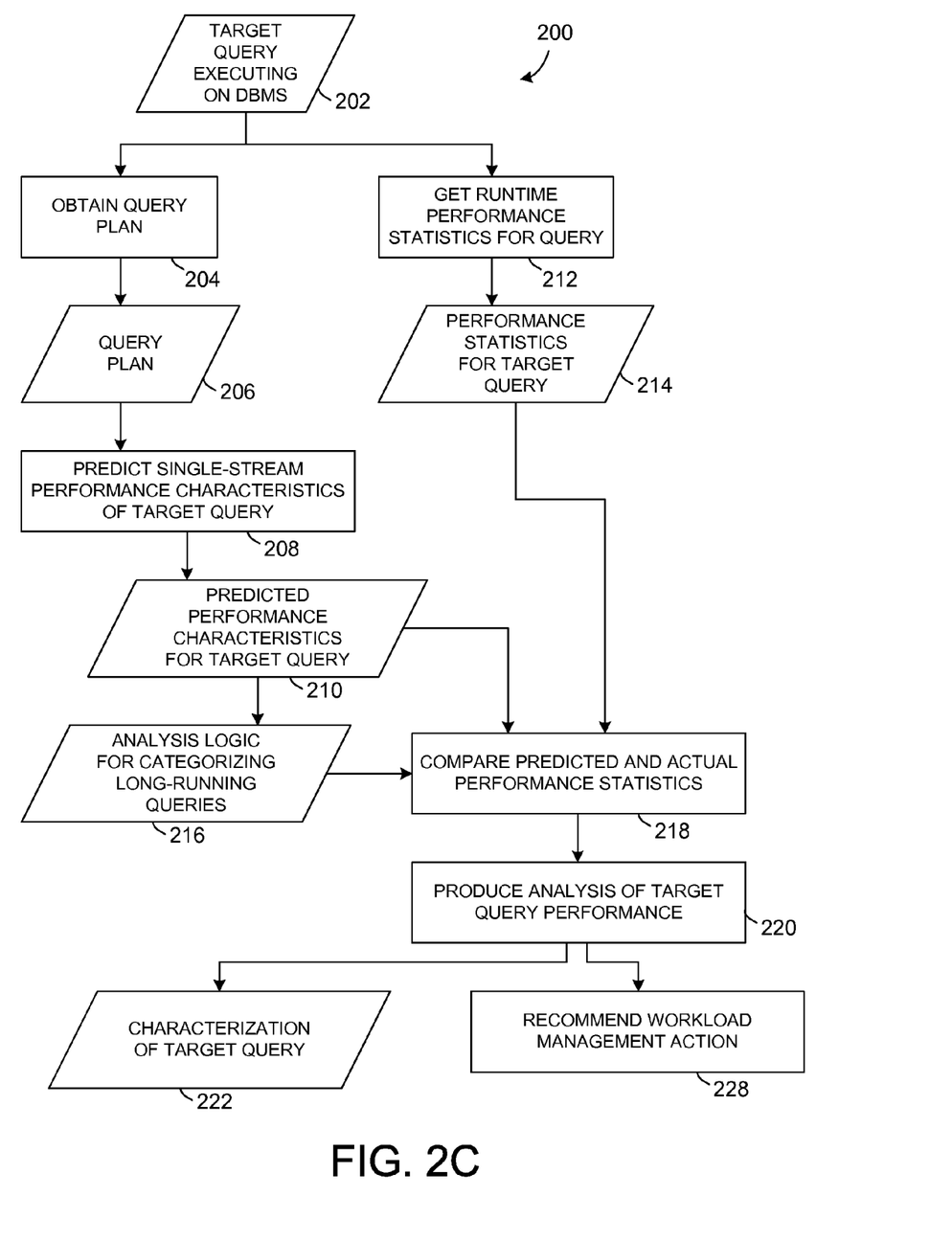

Referring to FIG. 2C, a schematic flow chart depicts another embodiment of a method 200 for analyzing progress for database queries that includes the option of recommending 228 a course of action to pursue, based on the analysis. For example, in the previous example, the analysis may recommend terminating a query that is currently dominating the system, thereby improving system performance.

A tool using the query analyzer 108 can be implemented either on the same machine that executes the database server, or a separate machine.

The query analyzer 108 produces an analysis of the progress of a running query in terms of multiple resources, thereby supporting the fact that different types of query operators place different requirements upon different types of resources.

The query analyzer 108 does not require operator-specific instrumentation, for example in-order instrumentation to track tuple usage, although the query analyzer 108 can use and leverage such instrumentation if available.

The query analyzer 108 can be implemented in combination with existing tools and applications.

Figure 3:
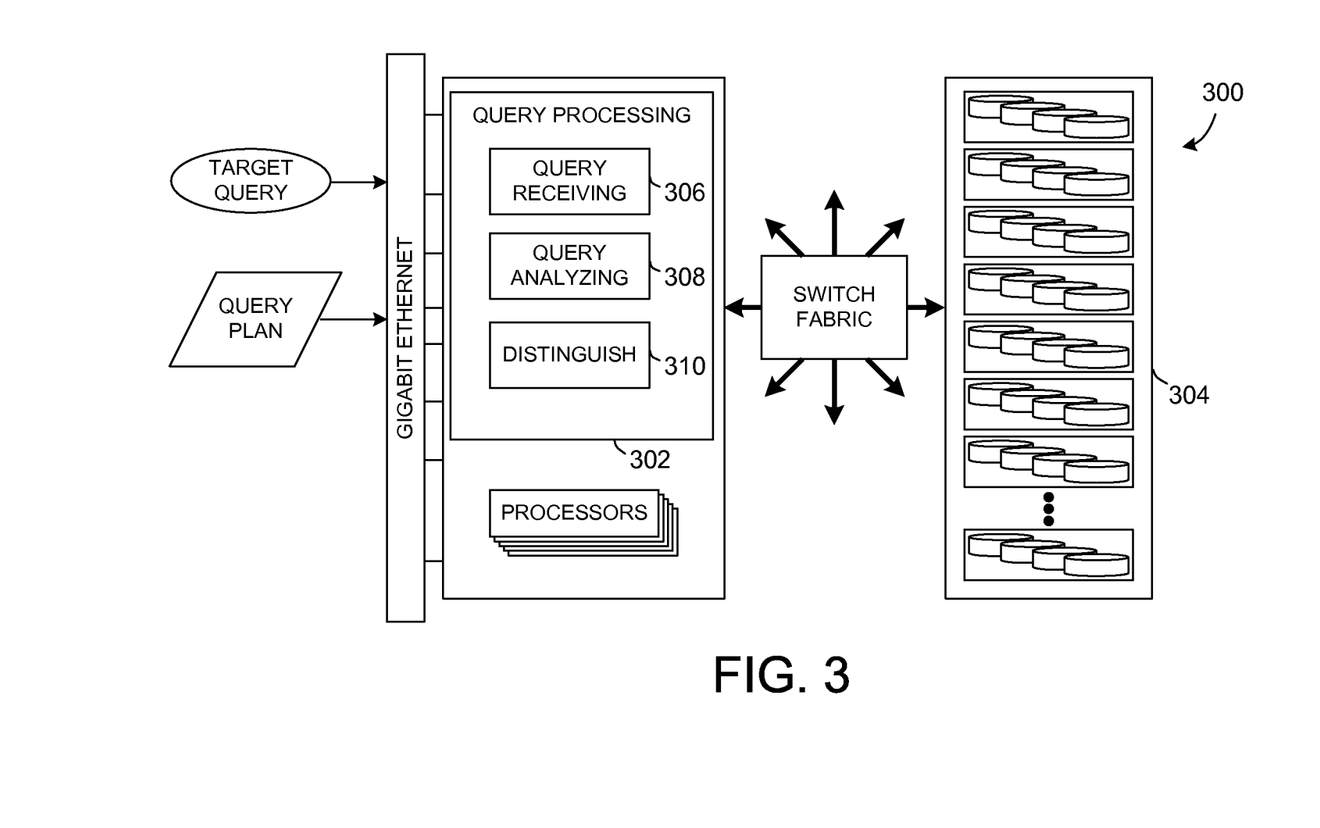
FIG. 3 is a schematic block diagram illustrating an embodiment of a computer-implemented database system query progress analysis capability.

Referring to FIG. 3, a schematic block diagram illustrates an embodiment of a computer-implemented database system 300 with query progress analysis capability. The computer-implemented database system 300 comprises means 302 for performing query processing in a database 304. The query processing performance means 302 comprises means 306 for receiving database queries including a target query directed to the database 304, and means 308 for analyzing progress status of the target query based on comparison of measured target query resource usage to resource usage predicted from a query plan of the target query and measured system resource usage. The query processing performance means 302 further comprises means 310 for distinguishing between metrics reflecting resources usable by multiple queries concurrently and resources with shared, alternate usage among multiple queries.

Figure 4:
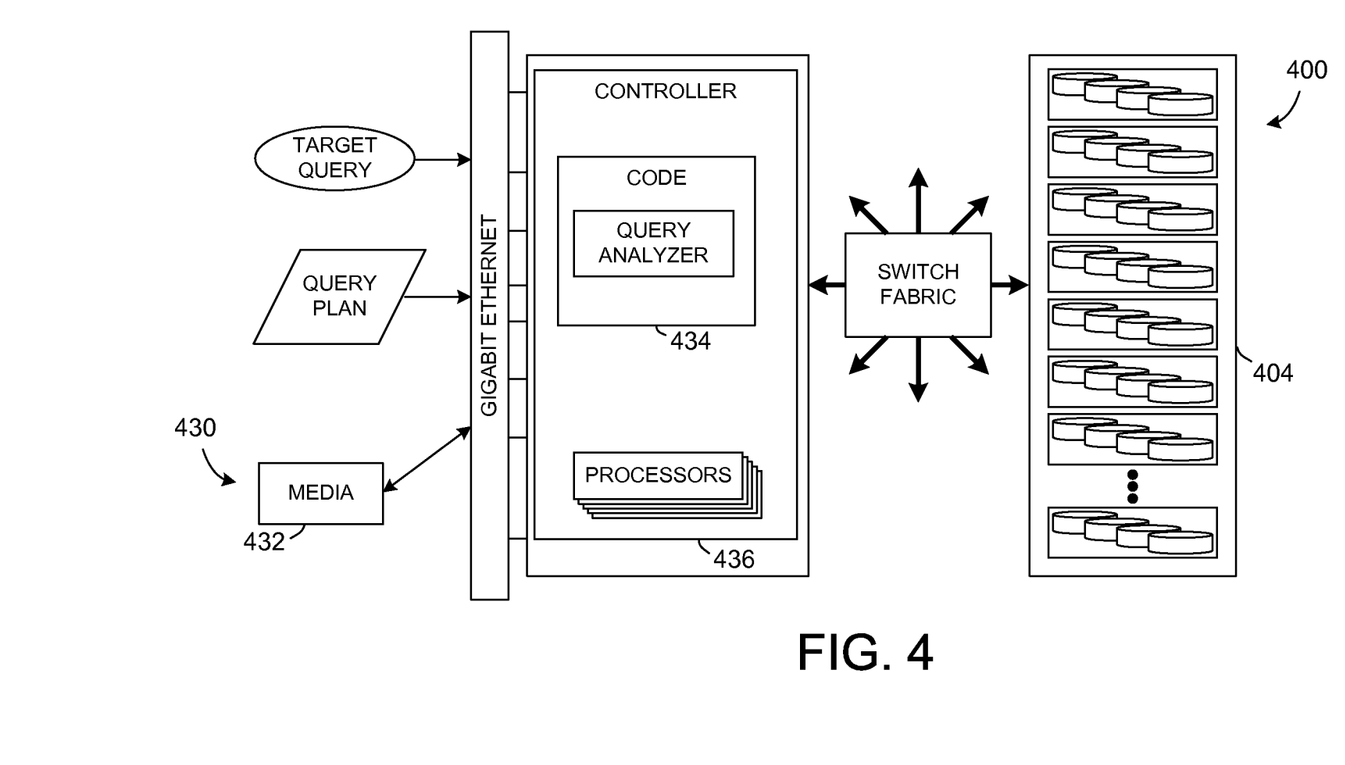
FIG. 4 is a schematic block diagram showing an embodiment of a computer-implemented database system with query progress analyzing functionality.

Referring to FIG. 4, a schematic block diagram illustrates an embodiment of a computer-implemented database system 400 with query progress analyzing functionality. The illustrative computer-implemented database system 400 can be in the form of an article of manufacture 430 that implements the database system management functionality, including query progress analysis. The article of manufacture 430 comprises a controller-usable medium 432 having a computer readable program code 434 embodied in a controller 436 for performing query processing in a database 404. The computer readable program code 434 comprises code causing the controller 436 to receive database queries including a target query directed to the database 404, analyze the target query progress status, and predict performance characteristics based on the query plan. The computer readable program code 434 further comprises code causing the controller 436 to acquire a snapshot of resource usage of the executing target query for resources included in the prediction, and to compare the snapshot of resource usage to predicted total resource usage.

Figure 5A:
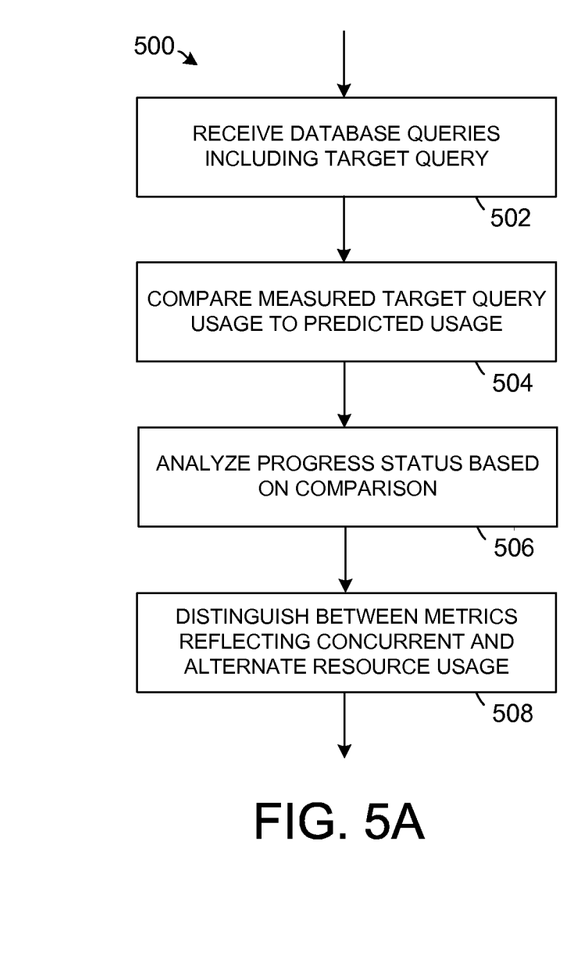
FIGS. 5A and 5B are flow charts depicting one or more embodiments or aspects of a computer-executed method for performing query progress analysis in a database.
Figure 5B:
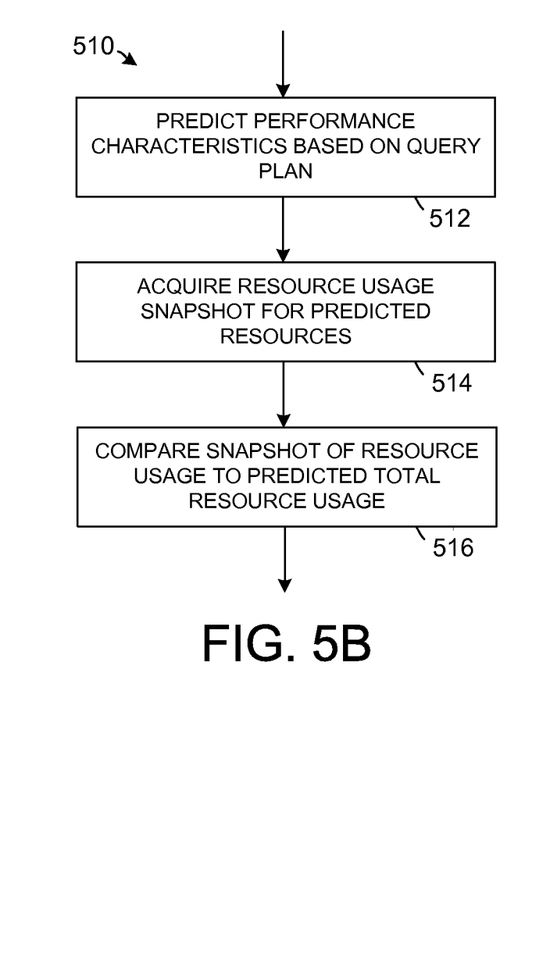

Referring to FIGS. 5A and 5B, flow charts illustrate one or more embodiments or aspects of a computer-executed method for performing query progress analysis in a database. FIG. 5A depicts a computer-executed method 500 for operating a database processing system comprising receiving 502 database queries including a target query directed to a database, and comparing 504 measured target query resource usage to resource usage predicted from a query plan of the target query. Progress status of the target query is analyzed 506 based on the comparison. The method 500 further comprises distinguishing 508 between metrics reflecting resources usable by multiple queries concurrently and resources with shared, alternate usage among multiple queries.

Referring to FIG. 5B, a computer-executed method for analyzing 510 the target query progress status comprises predicting 512 performance characteristics based on the query plan and measured system resource usage, and acquiring 514 a snapshot of resource usage of the executing target query for resources included in the prediction. The snapshot of resource usage is compared 516 to predicted total resource usage.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A database processing system comprising:
   a receiver to receive database queries including a target query directed to a database; and
   a query analyzer in communication with the receiver and including a processor, the query analyzer to analyze a progress status of the target query at runtime by comparing measured target query resource usage to resource usage predicted from a query plan of the target query and to measured usage of resources by the database processing system, wherein the measured target query resource usage includes at least one of (1) an amount of central processing unit execution time; (2) a number of storage disk inputs; (3) a number of storage disk outputs; (4) an amount of memory used; or (5) a number of messages exchanged.

2. The system according to claim 1 wherein the query analyzer is to analyze the target query progress status by predicting performance characteristics based on the query plan, acquiring a snapshot of resource usage of the target query being executed for resources included in the prediction, and comparing the snapshot of resource usage to predicted total resource usage.

3. The system according to claim 1 wherein the query analyzer is to acquire a snapshot of performance statistics for the database while the database is running.

4. The system according to claim 1 wherein the query analyzer is to recommend an action based on the comparison of the measured target query resource usage to the resource usage predicted from the query plan of the target query.

5. The system according to claim 1 further including a database server to service the target query, and the query analyzer to execute on the database server.

6. The system according to claim 1 further including a database server to service the database queries.

7. The system according to claim 1 wherein the query analyzer is to analyze the target query in terms of a plurality of resource types.

8. The system according to claim 1 wherein the query analyzer is to predict performance characteristics of the target query when run in isolation on a selected database system based on the query plan of the target query.

9. The system according to claim 1 wherein the query analyzer is to measure statistics of resource usage by the database processing system and overall system usage statistics at runtime of the target query.

10. The system according to claim 1 wherein the query analyzer is to categorize executing queries in terms of a ratio of predicted to actual resource usage including consideration of elapsed time.

11. The system according to claim 1 wherein the query analyzer is to distinguish between metrics reflecting resources usable by multiple queries concurrently and resources with shared, alternate usage among multiple queries.

12. A method of operating a database processing system comprising:
    comparing, via a processor, measured target query resource usage to resource usage predicted from a query plan of a target query directed to a database;
    analyzing, via the processor, a progress status of the target query based on the comparison; and
    distinguishing, via the processor, between metrics reflecting resources usable by multiple queries concurrently and resources with shared, alternate usage among multiple queries based on the analysis of the progress status, wherein the measured target query resource usage includes at least one of (1) an amount of central processing unit execution time; (2) a number of storage disk inputs; (3) a number of storage disk outputs; (4) an amount of memory used; or (5) a number of messages exchanged.

13. The method according to claim 12 wherein the analyzing of the progress status of the target query includes:
    predicting a total resource usage based on the query plan and measured usage of resources by the database processing system;
    acquiring a snapshot of the measured target query resource usage for resources included in the prediction, the snapshot to be acquired during runtime of the target query; and
    comparing the snapshot of the measured target query resource usage to the predicted total resource usage.

14. A tangible machine readable storage medium comprising machine-readable instructions that, when executed, cause a machine to at least:
    compare measured target query resource usage to resource usage predicted from a query plan of a target query and to measured usage of resources by a database processing system to analyze progress status of the target query during execution of the target query; and
    distinguish between metrics reflecting resources usable by multiple queries concurrently and resources with shared, alternate usage among multiple queries, wherein the measured target query resource usage includes at least one of (1) an amount of central processing unit execution time; (2) a number of storage disk inputs; (3) a number of storage disk outputs; (4) an amount of memory used; or (5) a number of messages exchanged.

15. A machine readable storage medium as defined in claim 14, wherein the machine-readable instructions, when executed, further cause the machine to:
 predict a total resource usage based on the query plan;
 acquire a snapshot of resource usage of the target query during execution for resources included in the prediction; and
 compare the snapshot of the resource usage of the target query during execution to predicted total resource usage.

16. The system according to claim 1, wherein the progress status includes at least one of an elapsed time since execution of the target query began, a predicted time remaining before query completion, or a total resource usage by the target query relative to a predicted total resource usage for the target query.

17. The system according to claim 1, wherein the query analyzer is to estimate a remaining central processing unit time for the target query by comparing a number of tuples emitted by the database processing system to an estimated output cardinality of the target query.

18. The system according to claim 1, wherein the query analyzer is to estimate a remaining central processing unit time for the target query by converting an estimated execution time from a query optimizer into an estimate of central processing unit time and comparing the estimate of central processing unit time to the actual amount of central processing unit time consumed by the target query.

19. The system according to claim 1, wherein the query analyzer is to estimate a remaining central processing unit time for the target query by relating a number of tuples processed by the database processing system to central processing unit time and determining the remaining central processing unit time for the target query based on the relationship and the number of tuples processed by the database processing system.

* * * * *